US008831282B2

(12) United States Patent
Guan

(10) Patent No.: US 8,831,282 B2
(45) Date of Patent: Sep. 9, 2014

(54) IMAGING DEVICE INCLUDING A FACE DETECTOR

(75) Inventor: Haike Guan, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 131 days.

(21) Appl. No.: 13/441,252

(22) Filed: Apr. 6, 2012

(65) Prior Publication Data

US 2012/0275648 A1    Nov. 1, 2012

(30) Foreign Application Priority Data

Apr. 26, 2011    (JP) ................. 2011-097935
Feb. 16, 2012    (JP) ................. 2012-031360

(51) Int. Cl.
*G06K 9/00*    (2006.01)

(52) U.S. Cl.
USPC ............................................. 382/103

(58) Field of Classification Search
CPC ................................. H04N 5/23203
See application file for complete search history.

(56) References Cited

U.S. PATENT DOCUMENTS

| | | | |
|---|---|---|---|
| 2009/0109304 | A1 | 4/2009 | Guan |
| 2009/0228841 | A1 | 9/2009 | Hildreth |
| 2010/0027906 | A1 | 2/2010 | Hara et al. |
| 2010/0073497 | A1 | 3/2010 | Katsumata et al. |
| 2010/0164862 | A1* | 7/2010 | Sullivan et al. ............... 345/156 |
| 2010/0202693 | A1 | 8/2010 | Song et al. |
| 2011/0122264 | A1 | 5/2011 | Yamanaka et al. |
| 2011/0298946 | A1 | 12/2011 | Guan et al. |
| 2011/0310007 | A1* | 12/2011 | Margolis et al. ............... 345/157 |

FOREIGN PATENT DOCUMENTS

| | | |
|---|---|---|
| CN | 1940964 A | 4/2007 |
| JP | 07-038873 | 2/1995 |
| JP | 2010-74735 | 4/2010 |
| JP | 4561914 | 8/2010 |
| JP | 2011-78009 | 4/2011 |
| JP | 2011-244046 | 12/2011 |
| WO | 2011/142480 A1 | 11/2011 |

OTHER PUBLICATIONS

Machine translation of JPN 2011-078009.*
U.S. Appl. No. 13/519,610, filed Jun. 28, 2012, Guan.
Chinese Office Action dated May 5, 2014, issued in Chinese Patent Application No. 201210126650.1 (with English translation).

* cited by examiner

*Primary Examiner* — Atiba O Fitzpatrick
(74) *Attorney, Agent, or Firm* — Oblon, Spivak, McClelland, Maier & Neustadt, L.L.P.

(57) ABSTRACT

An imaging device includes an image input section which sequentially inputs image data with a predetermined time interval, a face detector to detect a face area of a subject from the image data, a rotational motion detector to detect a rotational motion between two frames of image data input with the predetermined time interval, and a controller to control the imaging device to execute a predetermined operation when the rotational motion is detected by the rotational motion detector. The rotational motion detector detects a candidate of rotational motion between the two frames of image data and calculate a coordinate of a rotation center and a rotational angle of the candidate, and determine whether or not the candidate is the rotational motion from a central coordinate of the detected face area, the coordinate of the rotation center and the rotational angle.

20 Claims, 10 Drawing Sheets

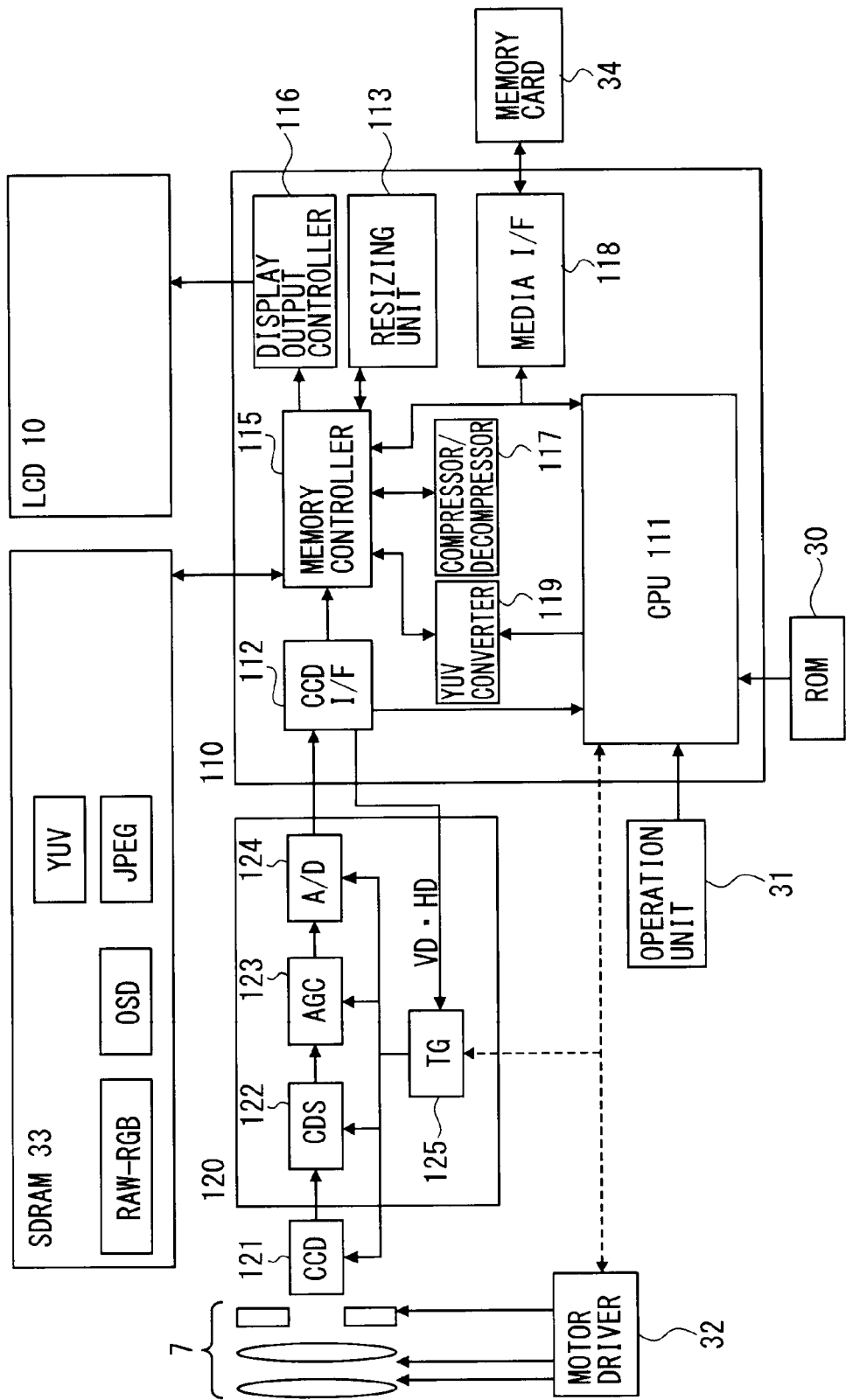

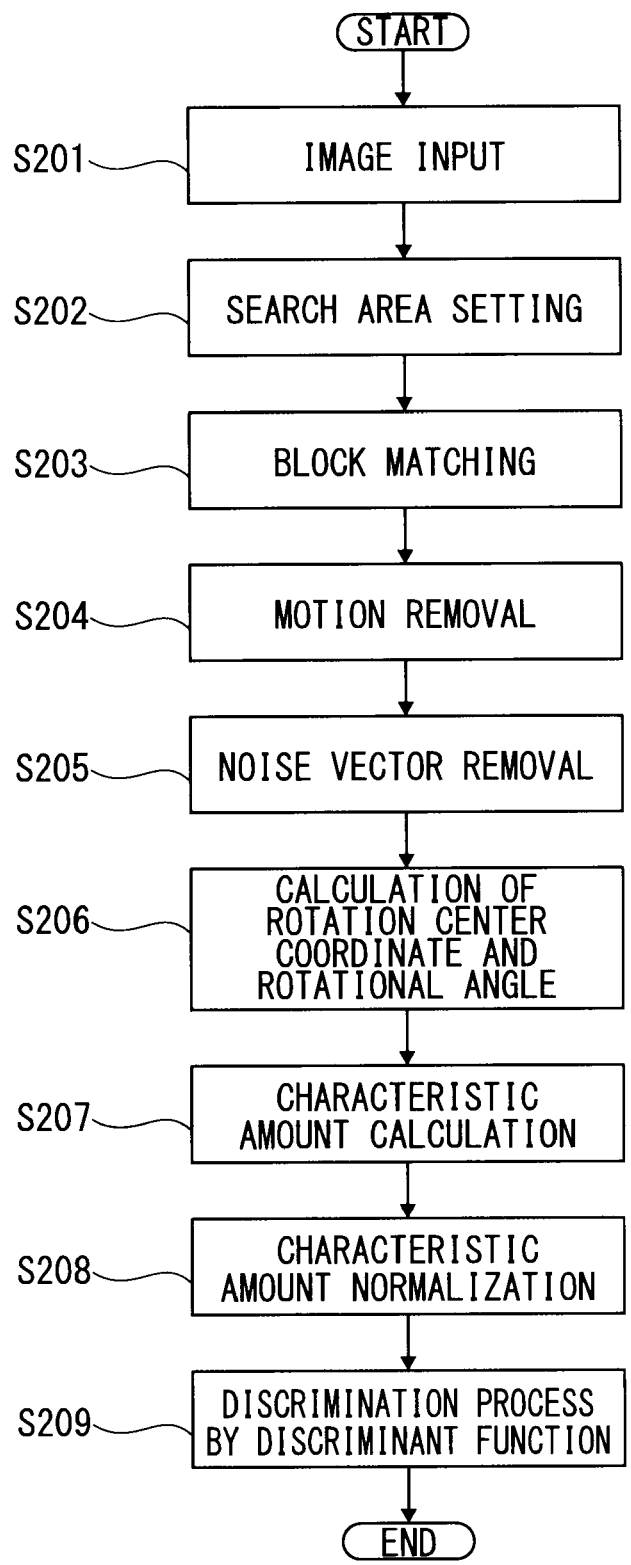

IMAGING DEVICE INCLUDING A FACE DETECTOR

CROSS REFERENCE TO RELATED APPLICATION

The present application is based on and claims priority from Japanese Patent Application No. 2011-97935, filed on Apr. 26, 2011 and No. 2012-31360, filed on Feb. 16, 2012, the disclosure of which is hereby incorporated by reference in its entirety.

BACKGROUND OF THE INVENTION

1. Field of the Invention

The present invention relates to an imaging device and imaging method and program to recognize a subject and control imaging operation on the basis of the motion of the subject.

2. Description of the Prior Art

An imaging device such as a digital camera or a digital video camera with an auto shutter function has been widespread. The auto shutter function is to shoot a subject at arbitrary timing automatically or in a predetermined time after a full press of the shutter button.

In conventional automatic shooting, a problem may occur that if a user shoots himself or herself after setting a camera and pressing a shutter button, the shooting may be completed before the user is ready for being shot or the user has to wait for the shutter to click after he or she is ready for being shot.

Further, an imaging device which can release the shutter with a remote control has been developed. However, a user may forget to carry a remote control or find it troublesome to carry it with him or her all the time.

In view of the above problems, Japanese Patent Application Publication No. 2010-74735 discloses an imaging device having an automatic shutter control function in accordance with the blinking of the eyes of a subject, for example. This imaging device sets the order of priority when capturing multiple subjects or faces to recognize the motion of a subject's face with a high priority or to output a control signal in accordance with a combination of the opening and closing of the eyes of the high-priority subject.

However, the above technique faces a problem that it is difficult to recognize the motion of a part of a small face when the subject is at a long distance from the imaging device. For example, generally, a group photograph is taken at a relatively long distance with a wide-angle zoom and the size of the individual faces captured tends to be small. Under such shooting condition, even if the faces are accurately detected, it is very hard to accurately recognize a change in a part of the faces such as blinking eyes, making automatic shooting control unfeasible.

To recognize the motion of a part of the faces accurately, the subjects need to be close to the imaging device or their faces need to be imaged in a certain size or more, using a telephoto zooming.

Further, Japanese Patent Application Publication No. 2011-78009 discloses an imaging device configured to detect a subject's face or gesture from an image. This imaging device detects a facial image from image data and detects a hand image in association with the facial image to control imaging operation in accordance with the shape or motion of the detected hand image.

However, it is disadvantageous that the imaging device requires an enormous amount of information as data on the position of a body part, color data, size data, and texture data to accurately recognize a subject's gesture. Also, it takes a huge amount of time and load on the device to process the enormous amount of data. Moreover, since the ways of gesturing, the color of skin, and the shapes and sizes of a body part are different depending on an individual, even the enormous amount of data may not be sufficient to accurately recognize someone's gesture.

SUMMARY OF THE INVENTION

An object of the present invention is to provide imaging device, method, and program to be able to stably, accurately recognize a subject's gesture at high speed on the basis of a subject's face area detected from an image and a coordinate of the center of rotational motion of the subject and the rotational angle, as well as to control shooting operation on the basis of the detected gesture.

According to one aspect of the present invention, an imaging device includes an image input section which sequentially inputs image data with a predetermined time interval, a face detector configured to detect a face area of a subject from the image data, a rotational motion detector configured to detect a rotational motion between two frames of image data input with the predetermined time interval, and a controller configured to control the imaging device to execute a predetermined operation when the rotational motion is detected by the rotational motion detector, wherein the rotational motion detector is configured to detect at least one candidate of rotational motion between the two frames of image data and calculate a coordinate of a rotation center and a rotational angle of the at least one candidate, and determine whether or not the at least one candidate is the rotational motion on the basis of a central coordinate of the face area detected by the face detector, the coordinate of the rotation center and the rotational angle.

BRIEF DESCRIPTION OF THE DRAWINGS

Features, embodiments, and advantages of the present invention will become apparent from the following detailed description with reference to the accompanying drawings:

FIG. 2 is a function block diagram of the imaging device in FIG. 1;

FIG. 6 is a flowchart for rotational motion detection;

FIG. 7A shows an example of an image data frame before an arm is moved while

FIG. 9A shows an example of an image data frame divided into blocks before an arm is moved while

DESCRIPTION OF THE PREFERRED EMBODIMENT

Figure 1A:
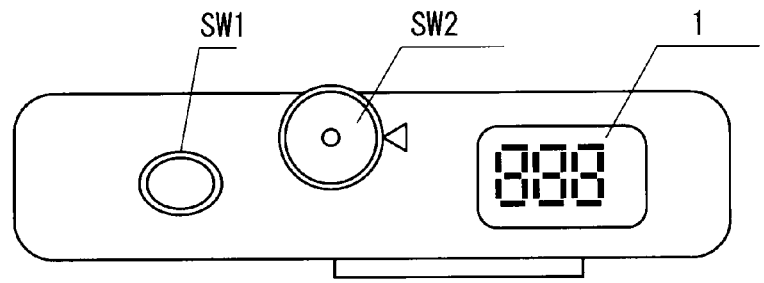
FIGS. 1A to 1C are a top view, a front view, and a back view of a digital camera as an example of an imaging device according to one embodiment of the present invention, respectively.

Hereinafter, one embodiment of the present invention will be described in detail with reference to the accompanying drawings. Wherever possible, the same reference numbers will be used throughout the drawings to refer to the same or like parts.

An imaging device comprises an image input section 101 which sequentially inputs image data Fa with a predetermined time interval, a face detector 102 configured to detect a face area 50 of a subject 40 from the image data, a rotational motion detector 103 configured to detect a rotational motion between two frames Fb, Fc of image data input with the predetermined time interval, and a controller as a shutter controller 105 configured to control the imaging device to execute a predetermined operation when the rotational motion is detected by the rotational motion detector, wherein the rotational motion detector is configured to detect at least one candidate of rotational motion as a motion vector between the two frames of image data and calculate a coordinate of a rotation center O' and a rotational angle θ of the at least one candidate, and determine whether or not the at least one candidate is the rotational motion on the basis of a central coordinate O of the face area detected by the face detector, the coordinate of the rotation center and the rotational angle.

The present embodiment describes a digital camera as an example of the imaging device. The imaging device should not be limited to a digital camera and can be any imaging device with an automatic shooting function.

Figure 1B:
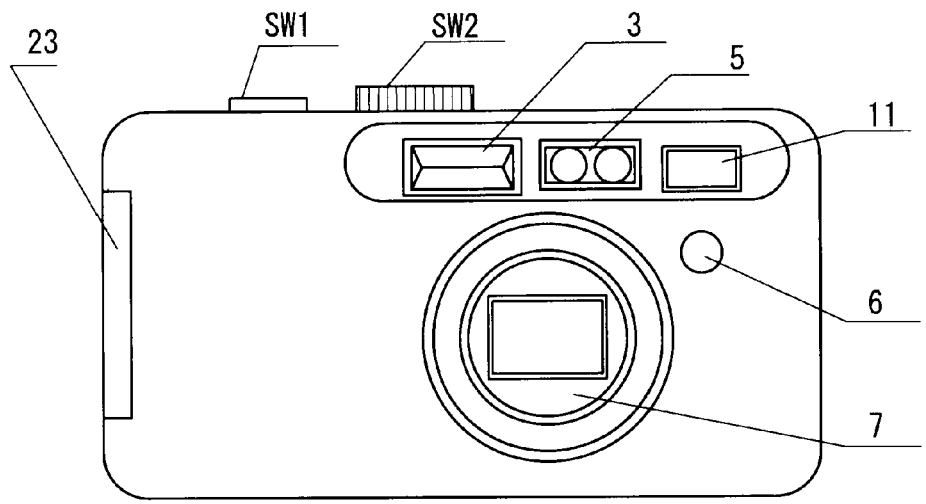
Figure 1C:
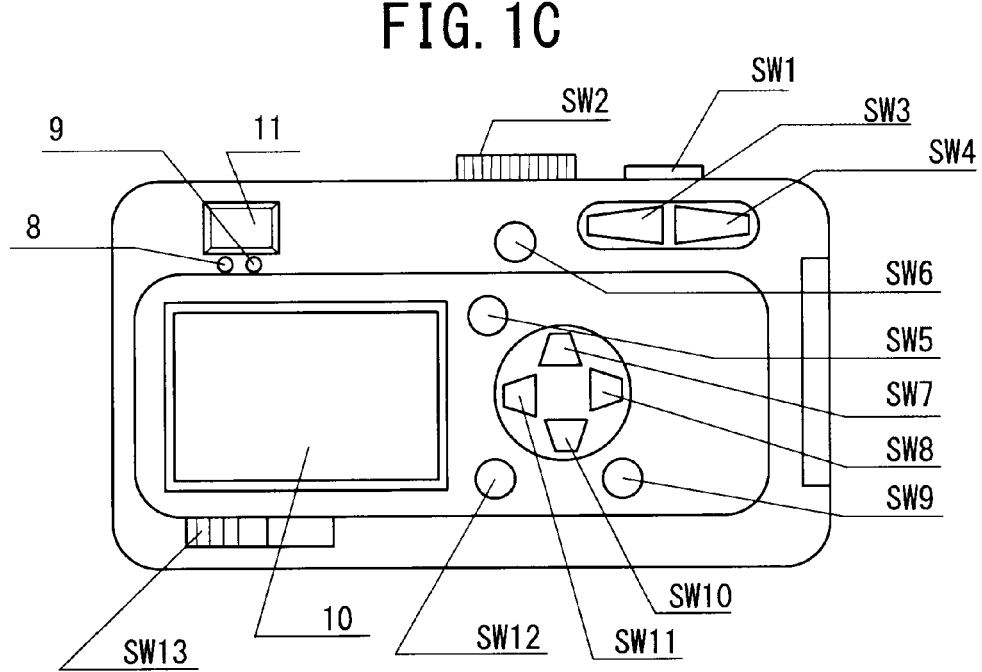

FIGS. 1A to 1C are a top view, a front view, and a back view of the exterior of a digital camera, respectively. In FIG. 1A the digital camera includes, on the top face, a sub LCD1, a shutter button SW1, and a mode dial SW2.

In FIG. 1B it includes, on the front face, a stroboscopic portion 3, a ranging unit 5, and a remote control light receiving portion 6, a lens unit 7, and an optical finder 11. A memory card throttle 23 into which a memory card 34 as an SD card is inserted is provided on a side of the camera body.

In FIG. 1C the digital camera includes, on the back face, an autofocus light emitting diode (LED) 8, a stroboscopic LED 9, a LCD 10, the optical finder 11, a telescopic zoom switch SW4, a power switch SW13, a wide-angle zoom switch SW3, a self-timer set/reset switch 15 SW6, a menu switch SW5, an OK switch SW12, a leftward/image check switch SW11, a downward/macro switch SW10, an upward/strobe switch SW7, a rightward switch SW8, and a display switch SW9.

FIG. 2 is a function block diagram of a control system of the digital camera in FIG. 1. It comprises a CCD 121 as a solid image sensor, a front end IC 120 to convert an electric signal from the CCD 121 to a digital signal, a signal processor IC 110 to process the digital signal from the front end IC 120, an SDRAM 33 to temporarily store data, an ROM 30 in which control programs are stored, and a motor driver 32.

The lens unit 7 includes a zoom lens, a focus lens and a mechanical shutter and is driven by the motor driver 32 which is controlled by a CPU 111 included in the signal processor IC 110.

The CCD 121 on which pixels with RGB filters are arranged is to photo-electrically convert optical images and output analog RGB image signals.

The front end (F/E) IC 120 includes a correlated double sampling (CDS) 122 to sample analog image data from the CCD 121, an automatic gain controller (AGC) 123 to adjust the gain of the sampled imaged data, and an analog-digital (A/D) converter 124, and a timing generator (TG) supplied with a vertical synchronous signal (VD) and a horizontal synchronous signal (HD) from a CCD I/F 112 to generate drive timing signals for the CCD 121 and front end IC 120.

A not-shown clock generator supplies clocks to the system clock of the signal processor IC 110, the timing generator 125 and else. The timing generator 125 supplies clocks to the CCD I/F 112 in the signal processor IC 110 for pixel synchronization.

The digital signals input to the signal processor IC 110 from the front end IC 120 are temporarily stored as RGB data (RAW-RGB) in the SDRAM 33 by a memory controller 115.

The signal processor IC 110 comprises the CPU 111, CCDI/F 112, a resizing unit 113, the memory controller 115, a display output controller 116, a compressor/decompressor 117, a media I/F 118, and a YUV converter 119.

The CCD I/F 112 outputs the VD and HD synchronous signals to the CCD 101 and captures digital RGB signals from the A/D converter 124 in line with the synchronous signals, to write RGB data to the SDRAM 33 via the memory controller 115.

The display output controller 116 transmits display data from the SDRAM 33 to the display unit to display a captured image. It can transmit display data to the LCD 10 or output it as a TV video signal to an external device.

The display data refers to YCbCr data as natural images and on-screen display (OSD) data to display shooting mode icons and else. Both data are read by the memory controller 115 from the SDRAM 33 to the display output controller 116 which synthesizes the data as video data for output.

The compressor/decompressor 117 compresses YCbCr data for recording in JPEG format and decompresses the JPEG data to YCbCR data for output in reproduction.

The media interface (I/F) 118 performs image data read/write from/to the memory card 34 under the control of the CPU 111.

The YUV converter 119 converts RGB data stored in the SDRAM 33 into YUV data based on image process parameters set by the CPU 111 and writes it to the SDRAM 33.

The resizing unit 113 reads the YUV data and changes the size of it for display, recording, or thumbnail image display.

The CPU 111 is a controller of the entire system. Upon turn-on of the power-on switch, it has the control programs loaded onto the SDRAM 33 from the ROM 30, for example, to control the operations of the respective elements according to the control programs.

Further, the CPU 111 controls imaging operation, sets image process parameters, and controls the memories, display, and else according to instructions from an operation unit 31 with keys and buttons, a remote control, or an external terminal such as a personal computer.

The operation unit 31 is for a user to give instructions to the digital camera. In accordance with a user's operation, a predetermined instruction signal is input to the controller. The digital camera in FIG. 1, for example, comprises the shutter button 2 and various buttons such as the zoom buttons 12, 14 to set the magnification of optical or electronic zoom.

Upon detection of the turning-on of the power switch SW13 with the operation unit 31, the CPU 111 makes predetermined settings to the respective elements. An image generated on the CCD 121 via the lens unit 7 is converted into a digital video signal and input to the signal processor IC 110.

The digital video signal is then input to the CCD I/F 112 and photo-electrically converted to an analog signal. The CCD I/F 112 subjects the analog signal to a black level adjustment and else and temporarily stores it in the SDRAM 33. The YUV converter 119 reads the RAW-RGB image data from the SDRAM 33 and subjects it to gamma conversion, white balance adjustment, edge enhancement, and YUV conversion to generate YUV image data and write it to the SDRAM 33.

The YUV image data is read by the display output controller 116 and changed in size vertically and horizontally by the resizing unit 113 for output to a destination, for example, an NTSC system TV. Thereby, by changing the size of the data in synchronization with the VD signal, still image preview display is enabled.

Next, the preview operation and still image shooting of the digital camera are described.

When the user turns on the power switch SW13 and sets a still image shooting mode with the mode dial SW2, the digital camera is activated in a recording mode. Detecting this, the CPU 111 outputs a control signal to the motor driver 32 to move the lens unit 7 to a photographable position and activate the CCD 121, F/E IC 120, signal processor IC 110, SDRAM 33, ROM 30, and LCD 10.

An image of a subject captured via the optical system of the lens unit 7 is formed on the pixels of the CCD 121 and analog RGB image signals corresponding to the image are input to the A/D converter 124 via the CDS 122, AGC 123 and converted into 12-bit RAW-RGB data.

The RAW-RGB data is captured into the CCD I/F 112 of the signal processor IC 110 and stored in the SDRAM 33 via the memory controller 115. The YUV converter 119 converts the RAW-RGB data to displayable YUV data and stores it in the SDRAM 33 via the memory controller 115.

The YUV data is transmitted from the SDRAM 33 to the LCD 10 via the display output controller 116 for display of the captured image (video). During the preview of the captured image on the LCD 10, the number of pixels of the image is thinned out by the CCD I/F 112 to read one image frame in 1/30 second.

During the preview, the user can check the composition of the image and else for shooting a still image. The display output controller 116 can output a TV video signal to an external TV via a video cable to display a captured image on the TV.

The CCD I/F 112 of the signal processor IC 110 calculates an AF evaluation value, an AE evaluation value and an AWB (auto white balance) evaluation value from the RAW-RGB data.

The AF evaluation value is calculated from, for example, an integral of outputs of a high-pass filter or an integral of differences in brightness among neighboring pixels. In focus state the edge portion of a subject is distinctive with highest frequency components. In AF operation the AF evaluation value is found at each focus lens position to determine the point with the maximal evaluation value as a detected focus position.

The AE and AWB evaluation values are calculated from an integral of each of the RGB values of the RAW-RGB data. For example, an image area associated with all the pixels of the CCD 121 is equally divided into 256 blocks (16 by 16) to calculate an RGB integral value in each block.

The CPU 111 reads the RGB integral value to calculate brightness in each block and determine a proper exposure amount from brightness distribution in AE operation. It sets an exposure condition such as a number of electric shutters, f-value of an aperture diaphragm, opening/closing of an ND filter. In automatic white balance operation the AWB control value is determined from the RGB distribution in accordance with the color of a light source of a subject. Thereby, the YUV converter 119 performs YUV data conversion with white balance adjusted. During preview the AE and AWB operations are continuously executed.

Upon the shutter button 2's fully pressed during the preview to start a still image shooting, the AF operation and still image recording are executed.

That is, upon the shutter button 2's fully pressed, the controller instructs the motor driver 32 to move the focus lens of the optical system to execute a so-called hill climb (contrast evaluation) AF operation.

In the AF area from infinity to a nearest point, the focus lens is moved to each focus position from infinity to a nearest point or from a nearest point to infinity. The controller reads the AF evaluation value calculated at each focus position by the CCD I/F 112. The focus lens is moved to the position with a maximal AF evaluation value and placed into focus.

Then, the AE operation is performed. Upon completion of exposure, the controller instructs the motor driver 32 to close the mechanical shutter and the CCD 121 to output an analog RGB image signal for a still image. The A/D converter 124 of the F/E 120 converts it to the RAW-RGB data as in the preview.

The RAW-RGB data is transmitted to the CCD I/F 112 of the signal processor IC 110, converted into the YUV data by the YUV converter 119 and stored in the SDRAM 33 via the memory controller 115. The YUV data is changed in size by the resizing unit 113 in line with the number of pixels for recording and compressed into image data in JPEG form by the compressor/decompressor 117. The compressed image data is written to the SDRAM 33, read therefrom via the memory controller 115 and stored in the memory card 34 via the media I/F 118.

In the following the automatic shooting control of the imaging device based on face detection and rotational motion detection according to the present embodiment is described with reference to FIGS. 3 to 11.

The present embodiment describes an example in which the imaging device is controlled to execute shutter control and shooting operation on the basis of face detection and rotational motion detection. However, it should not be limited to such an example. Alternatively, it can be configured that the controller controls the power supply of the imaging device to turn off according to face detection and rotational motion detection, for example.

Figure 3:
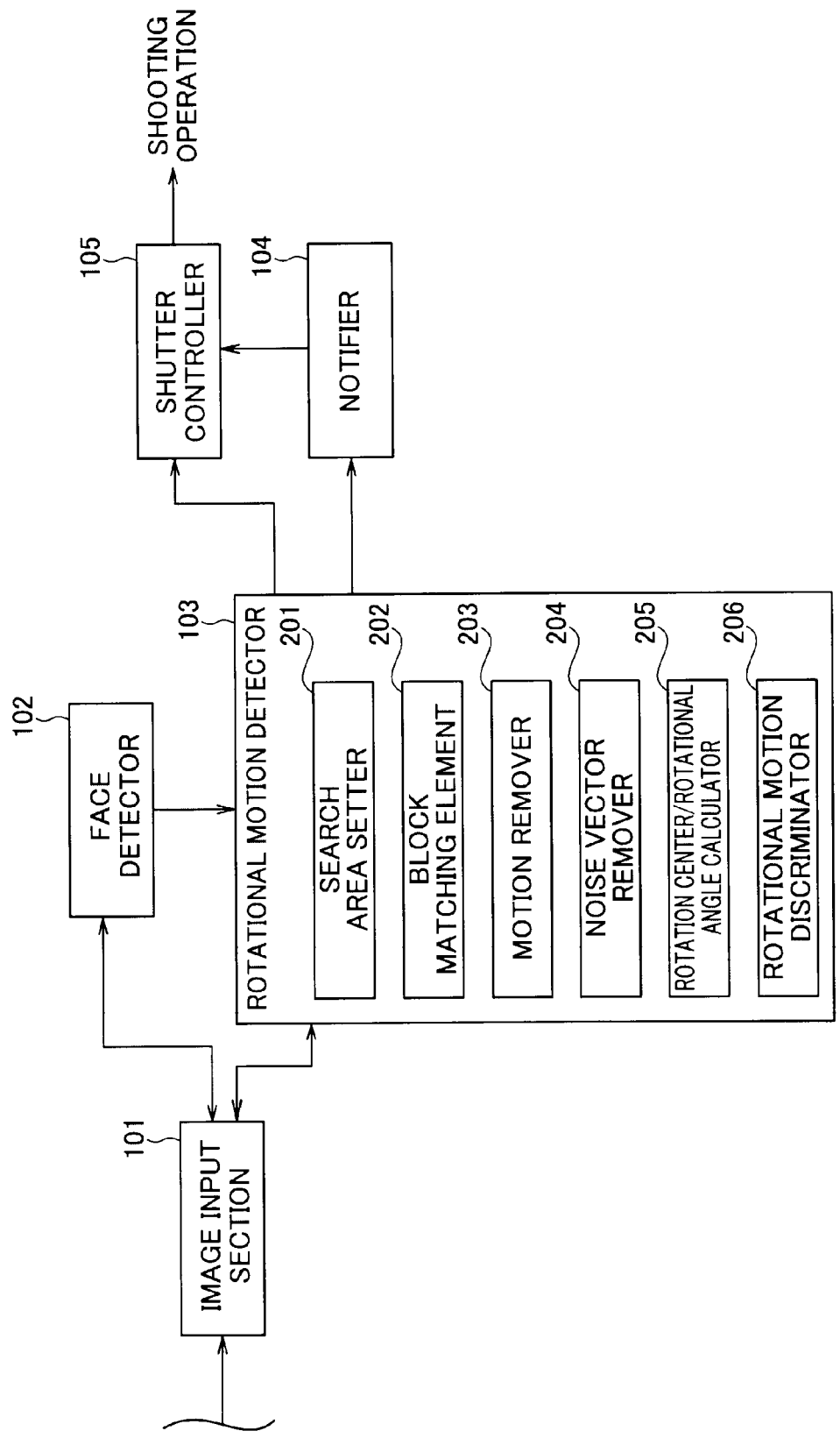
FIG. 3 is a block diagram of automatic shooting control of the imaging device.
Figure 4:
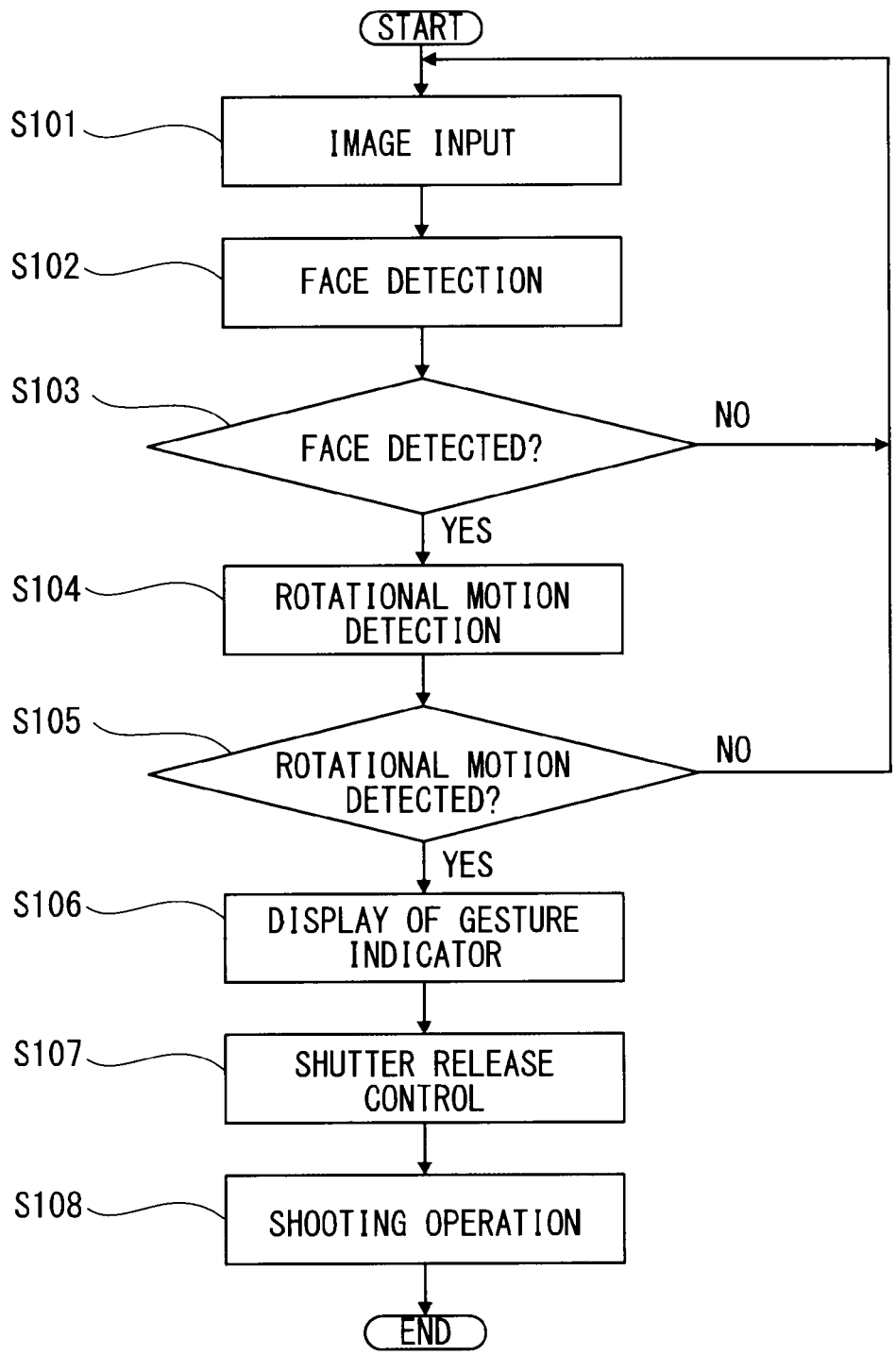
FIG. 4 is a flowchart for automatic shooting process.

FIG. 3 is a block diagram for automatic shooting control of the imaging device and FIG. 4 is a flowchart for the automatic shooting control executed by the control elements of the imaging device.

Figure 5:
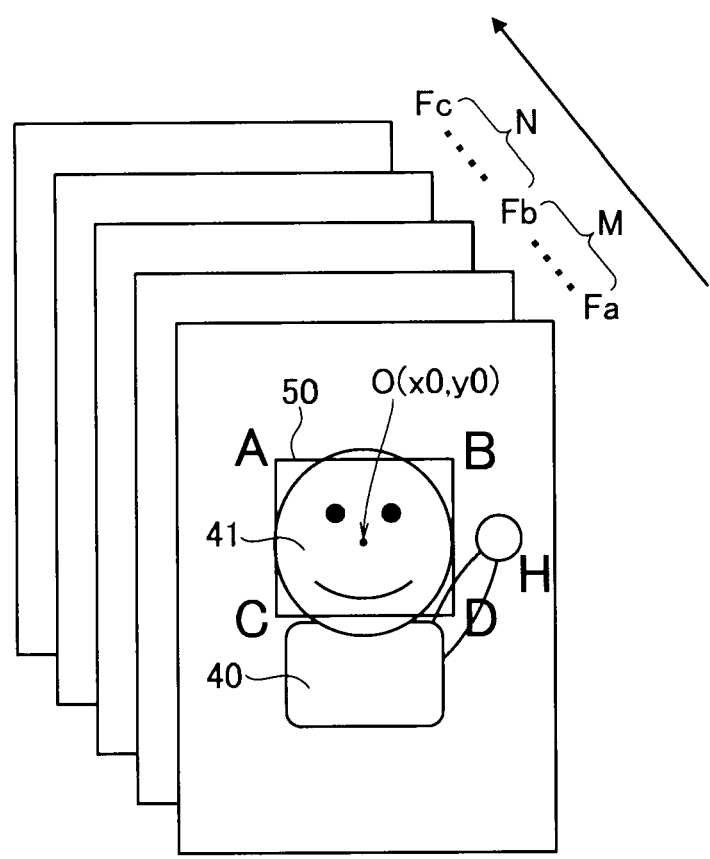
FIG. 5 shows an example of image data frames input in time series.

Frames of continuous image data in time series are input to an image input section 101 for display on the LCD 10 with a predetermined time interval Δt, for example, 33 msec, as shown in FIG. 5 (step S101).

In FIG. 5 a second frame of image data is input in a predetermined time Δt after a first frame of image data Fa. Thus, image data in time series are input and stored in the SDRAM 33.

A face detector 102 detects a subject's face from one frame of the image data input in sequence, for example, data frame Fa in step S102. In the present embodiment the face detector 102 is configured to detect a face area 50 equivalent to a face 41 of a subject 40. The face area 50 is surrounded by vertexes A to D with the central coordinate at O(x0, y0) in FIG. 5.

The algorithm for the face detection in step S102 can be any known or novel one such as pattern matching. Further, the subject does not have to be a person and can be an animal instead. In this case a process in which the face of an animal is recognized is executed. A later-described arm gesture detector 103 can be configured to detect the arm or leg (rotating body part) of the animal in question using data on the pre-learning results of a learning model.

In step S103 a determination is made on whether or not the face detector 102 has detected a face. When the result is No in step S103, the flow returns to the image input in step S101 and next image data is processed.

When a face is detected (Yes in step S103), a rotational motion detector 103 performs rotational motion detection in step S104. The rotational motion detection is described in detail with reference to FIG. 6.

Figure 7A:
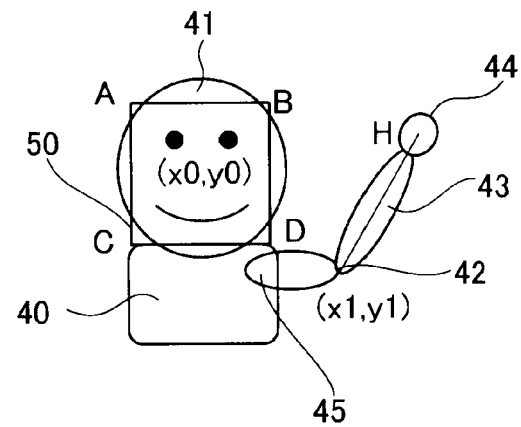
Figure 7B:
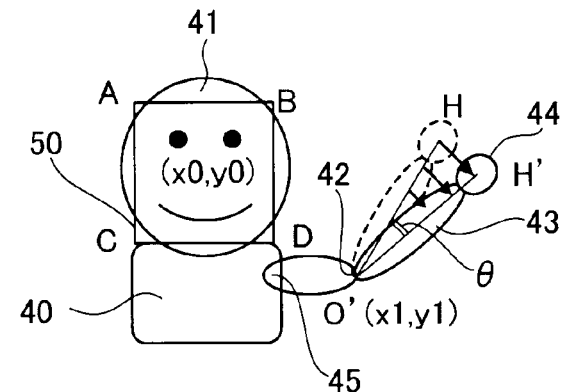
FIG. 7B shows the same after the arm is moved.

The present embodiment describes an example in which the rotational motion of a hand or palm 44 of the subject is detected while the subject is moving an arm 43 horizontally around an elbow 42 as the center of rotation. Herein, this rotational motion is referred to as arm gesture. FIG. 7A shows image data before the arm gesture and FIG. 7B shows the same after the arm gesture. Note that an area indicated by a broken line in FIG. 7B is added to clarify how the arm has moved.

Note that the arm gesture is not limited to the rotation of the hand 44 around the elbow 42. Instead, it can be the motion of the entire arm with a shoulder 45 as the center of rotation. Further, the rotary direction of the arm 43 should not be limited to the one in FIG. 7B, and the arm 43 can be held down from the elbow 42. The arm motion vertical to the image can be detected as long as a rotational angle between the frames occurs.

Other gestures than the arm gesture can be used as long as they are rotational motion around the base point. For example, when the subject 40 holds a tool such as a rod or a flag and rotates it, the center of the rotation and the top end of the rotating tool can be detected.

For detecting a gesture, relative motion data needs to be learned by a learning model in advance with a teacher to calculate discriminant formulas. Moreover, it is preferable to detect a plurality of kinds of gestures and allow the user to select one to control the imaging device.

Referring to FIG. 6, in step S201 image data is input to the image input section 101. In the present embodiment a first frame Fa of image data in which the face detector performs face detection and second and third frames Fb, Fc of image data in which the rotational motion detector 103 performs rotational motion detection are considered different image data. Image data Fb is defined to be image data input M-frames after the first image data Fa in FIG. 5. Preferably, the value M is a small value equal to or over 1.

Image data is input at a frame rate of 33 msec, for example. In order to avoid an increase in the workload of the imaging device, it is preferable not to concurrently perform face detection (step S102) and rotational motion detection (step S104) on the same image data frame. Instead, only either of the face detector 102 and the rotational motion detector 103 is preferably operated in a one-frame process time. Thereby, it is made possible to reduce the workload of the CPU in image processing by software and improve the processing speed and power efficiency. In image processing by an image processing chip having a specific function, operating only either of them can lead to reducing power consumption. With a margin of processing speed or performance, the image data Fa, Fb can be considered to be in the same frame.

The arm gesture in the two image frames Fb, Fc input with a predetermined frame interval N is detected in FIG. 5. The value of the frame interval N is preset as a parameter. The frame interval N can be set selectable and the minimal and maximal values thereof can be limited.

The interval N needs to be properly set in accordance with the speed of rotational motion of a subject to be detected. At a too large interval N, the rotational angle of an arm rotating at a certain angular velocity between the frames becomes too large or that of the arm in reciprocating rotation becomes too small.

According to the present embodiment, the frame interval N is determined on the basis of the assumed angular velocity of the arm and the frame rate of 33 msec so that the rotational angle θ of the arm falls within 45 to 90 degrees. For example, suppose that the arm rotates in the range of 45 to 90 degrees in about 0.5 second, the frame interval N will be 15.

The frame interval N can be arbitrarily set to 1 to detect the arm gesture between continuous frames or to about several frames, for example.

Figure 8:
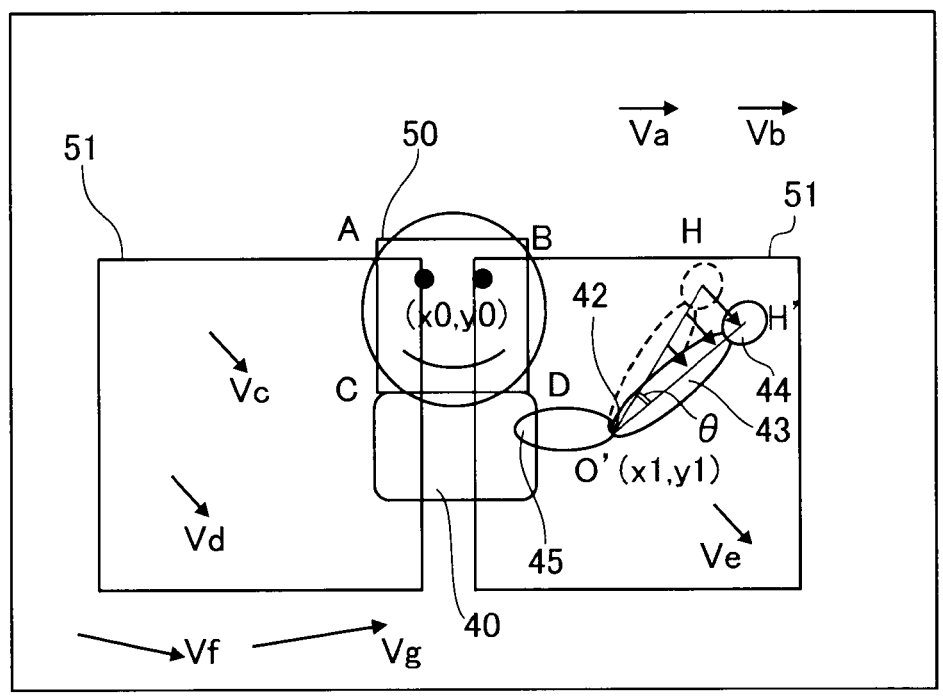
FIG. 8 shows a motion vector search area and motion vectors.

In step S202 a search area setter 201 sets a motion vector search area 51 in which an arm motion vector as a candidate of rotational motion is detected, according to the detected face area 50. The motion vector search area 51 is set in a movable area of the arm 43 in the frame, for example, in a predetermined pixel area around the face area 50 or the central coordinate O(x0, y0), as shown in FIG. 8. It is possible to detect a candidate of rotational motion over the entire image by a later-described processing instead of setting the motion vector search area 51. However, detection in the preset limited area is preferable to reduce throughput.

Figure 9A:
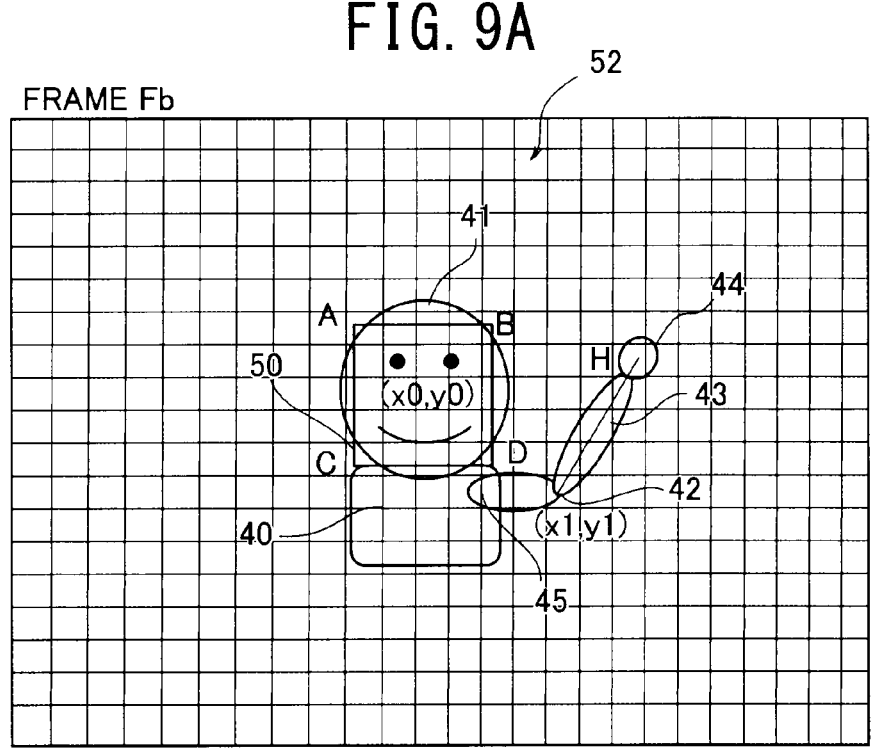
Figure 9B:
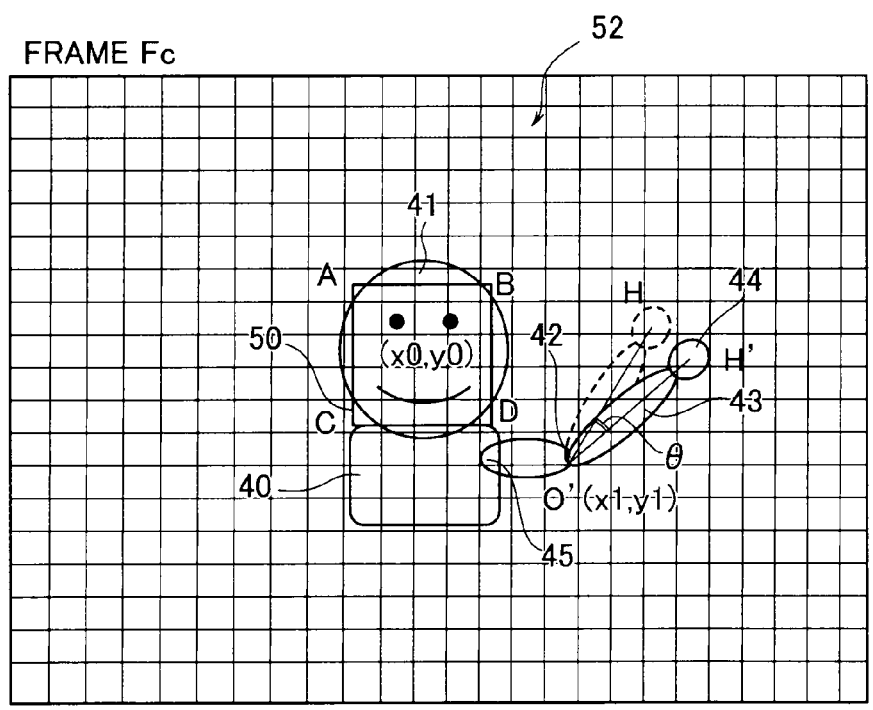
FIG. 9B shows the same after the arm is moved.

In step S203 a block matching element 202 detects, as a motion vector, an area in which a motion has been detected between the two frames. As shown in FIGS. 9A, 9B, the image data frames Fb, Fc are each divided into blocks 52 with a predetermined number of pixels (n by n) to find a motion amount or motion vector HH' between the same portions of the two frames by block matching. Block matching can be conducted by any known or novel technique.

The size of each block is a parameter which is properly set in accordance with a subject of rotational motion. In the present embodiment it is set so that the motion of the arm 43 is distinguishable. For example, it can be decided from the size of a face on the basis of a ratio of general face size and arm size. With the face area being 20 by 20 pixels, the block size can be 5 by 5 pixels.

Further, the starting and ending points of the motion vector are in the center block of the 5 by 5 pixel area by way of example. The block size can be arbitrarily set to an optimal value since the size of a subject changes in accordance with a focal length and a distance to the subject.

Next, in step S204 a motion remover 203 removes a motion or a blur having occurred in the entire image. When the imaging device is fixed on a tripod or the like, a motion or a blur in the entire image hardly occurs. Otherwise, it is preferable to detect and remove the amount of motion in the entire image. This can improve the accuracy of the detected motion vector.

That is, when there is a parallel movement or a rotation found in the entire image between the frames, the motion vector detected by block matching is affected by the movement so that it needs to be canceled.

For example, referring to FIG. 8, the motion vector in the entire image can be calculated using the motion vectors Va, Vb in areas other than the motion vector search area 51.

The motion between the frames is expressed by the following formula as affine transformation:

$$\begin{bmatrix} x1 \\ y1 \end{bmatrix} = \begin{bmatrix} a & b \\ c & d \end{bmatrix} \begin{bmatrix} x0 \\ y0 \end{bmatrix} + \begin{bmatrix} e \\ f \end{bmatrix}$$

where (x1, y1) and (x0, y0) are the coordinates of corresponding points in the frames Fb, Fc. With a large number (6 or more) of corresponding points, the coefficients a to e can be calculated.

The motion vector (Vx0, Vy0) in the entire image between the frames Fb, Fc at arbitrary coordinate (x, y) can be found by the above formula. Thus, the motion vector (Vx−Vx0, Vy−Vy0) can be obtained by subtracting the motion vector (Vx0, Vy0) in the entire image from that (Vx, Vy) at the coordinate (x, y).

As described above, it is able to eliminate the motion in the entire image by subtracting the motion vector in the entire image between the frames Fb, Fc from the motion vector detected. The remaining motion vector will be a candidate of arm rotational motion.

The present embodiment describes an example where the motion vector in the entire image is found according to the motion vector in the area other than the motion vector search area 51. However, it can be obtained from the motion vector in the motion vector search area 51. Further, the motion vector in the entire image can be calculated by sampling a certain number of blocks 52.

Moreover, the present embodiment describes an example where the motion amount in the parallel direction of the imaging device is corrected by affine transformation. However, it can be corrected by any known or novel technique. For example, the motion amount in the vertical direction of the image can be corrected by projective transformation.

In step S205 a noise vector remover 204 removes an isolated motion vector as a noise vector from the motion vector search area 51. This is to remove a motion vector considered to be not an actual arm motion in the motion vector search area 51 to prevent an erroneous detection of the arm motion.

Noise vectors Vc, Vd, Ve are shown in FIG. 8. In conducting block matching in the entire image, motion vectors Vf, Vg in an area other than the motion vector search area 51 have to be also removed.

To determine the presence of the noise vector, a determination is made on whether or not there are other motion vectors within a certain area (radius R) around the detected motion vector. With another motion vector found, the detected motion vector is determined as the arm motion vector. When no other motion vector is found, the detected motion vector is determined as the isolated noise vector. The radius R can be arbitrarily set, for example, to 20 pixels. Also, the pixel as a reference of the vector determination can be any pixel constituting the motion vector in question, for example, a starting point of the motion vector.

The noise vectors Vc, Vd, Ve as determined above are excluded from the motion vectors. Through steps S201 to S205, the arm motion vectors as a candidate of rotational motion are detectable.

Figure 10:
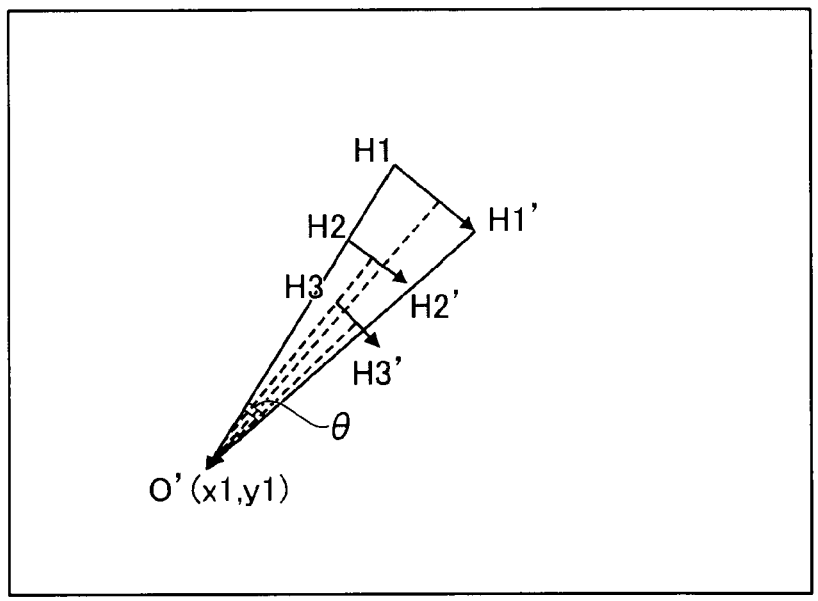
FIG. 10 shows how to calculate the coordinate of rotation center and rotational angle.

Next, in step S206 a rotation center/rotational angle calculator 205 calculates the coordinate of rotation center and a rotational angle on the basis of the detected motion vector. Referring to FIGS. 8 and 10, the coordinate O'(x1, y1) of the rotation center of arm gesture and the rotational angle θ are calculated on the basis of motion vectors H1H1', H2H2', H3H3'detected from the frames Fb, Fc. Although the three motion vectors H1 to H3 are used for the sake of simple explanation, the actual number Hn of detected motion vectors will be 10 or more, for example.

How to calculate the coordinate of the rotation center and rotational angle is described by way of example. The coordinate of the rotation center O'(x1, y1) is defined to be a point on which normal lines (indicated by broken lines in FIG. 10) passing the midpoints of motion vectors of the arm parts and vertical to the midpoints are gathered. With two or more intersection points, the coordinate of the rotation center O'(x1, y1) can be set to an average value of coordinates of intersection points of two neighboring normal lines in a case where the intersection points of the normal lines do not coincide with one another.

A rotation radius R1 is a distance between the coordinate of rotation center O'(x1, y1) and each motion vector, for example, a distance between a starting point H1 and an ending point H1'. The rotational angle θ1 is calculated by the following equation:

$$\theta 1 = L1/R1$$

where L1 is a length of the motion vector H1H1'.

In the present embodiment the rotational angle θ is defined to be 90 degrees or less. However, it can be configured to detect the rotational angle of 90 degrees or more. Further, the rotational angle θ1 can be found from the coordinate of rotation center O'(x1, y1) and the starting and ending points H1, H1' of the motion vector.

Likewise, the rotary radiuses R2, R3 and lengths L2, L3 of the motion vectors H2H2', H3H3' are found from the motion vectors to calculate the rotational angles θ2, θ3, respectively. The average value of the rotational angles θ1, θ2, θ3 is found as the arm rotational angle θ.

In steps S207 to S209 a rotational motion discriminator 206 determines whether or not the detected candidate of rotational motion is an actual arm gesture from a relation between the positions of the center of an arm rotation and the center of the face area and a characteristic amount of the rotational angle.

A positional shift amount is calculated from the central coordinate O(x0, y0) of the face area and that O'(x0, y0) of the arm rotation by the following equations. Distances dx, dy therebetween and the rotational angle θ are defined to be the characteristic amount for arm gesture detection in step S207.

$$dx = x1 - x0$$

$$dy = y1 - y0$$

Then, the characteristic amount is normalized in step S208. The size of a subject differs depending on the zoom ratio of the imaging device. For example, the entire image is changed in size and normalized so that the average facial size becomes 20 by 20 pixels. Thus, even with a change in a subject size, a common recognition dictionary can be used irrespective of zoom ratio to accurately recognize the arm rotational motion.

In step S209 a determination is made on whether or not the candidate is an arm gesture, using the characteristic amount and discriminant formula calculated in advance from machine learning.

The calculation of the discriminant formula is described. Sample data (video data) of arm gestures are collected to create an arm gesture recognition dictionary as data learned by learning model, using sample data of the positional relation between the rotation center of the face area and that of the arm gesture and the arm rotational angle (O'(x1, y1), dx, dy, and θ).

Specifically, a linear SVM discriminant function f(dx, dy, θ) is generated on the basis of the recognition dictionary by Support Vector Machine (SVM) as follows:

$$f = A^* dx + B^* dy + C^* \theta$$

The coefficients A, B, and C are calculated by pre-learning. With a value f obtained by the discriminant function f(dx, dy, θ) being over a threshold th, the candidate is recognized as an arm gesture. With the value f being lower than the threshold th, it is recognized as a non-arm gesture.

Figure 11:
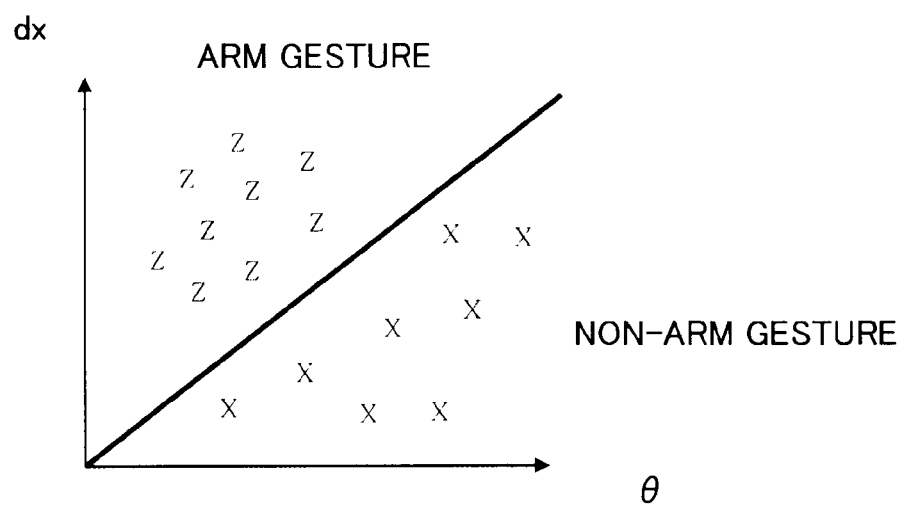
FIG. 11 is a graph showing the discrimination of an arm gesture by support vector machine (SVM).

FIG. 11 is a graph showing distributions of the characteristic amounts of arm gesture and non-arm gesture. For the sake of simplicity, two variables dx and θ are used in the graph so that a recognition level is linear. The points z over the line are recognized as arm gesture while those x below the line are recognized as non-arm gesture. With use of three variables (dx, dy, θ), the distribution will be a three-dimensional space and the recognition level will be planar. The characteristic amounts over the recognition plane are of arm gesture and those below the recognition plane are of non-arm gesture.

By this learning method using the characteristic amount, it is possible to accurately recognize the arm gesture even with a difference in subjects' arm lengths or a difference in the arm rotational angles and the relative positions of the center of the face area and that of the arm rotation.

The present embodiment describes an example where the linear SVM is used as a learning model for creating the recognition dictionary. Alternatively, a non-linear discriminant function can be used, or other learning models such as AdaBoost can be used. Note that the recognition dictionary is prepared in advance and the discriminant function calculated by the recognition dictionary is stored in the memory unit of the imaging device.

Returning to FIG. 4, with the function value f being over the threshold th (Yes in step S105), the presence of a desired arm gesture is determined. With the function value f being below the threshold th (No in step S105), the presence of a desired arm gesture is not determined so that the flow returns to the image input in step S101.

When the presence of the arm gesture is determined, a notifier 104 displays an indicator to notify the presence to a user or a person as a subject of the detection of the arm gesture in step S106.

The notifier can be configured to notify the detection in various manners. For example, a not-shown LED light or any other type of light is provided on the front face of the imaging device to turn on. Also, text or marks can be displayed on the sub LCD or LCD 10. Alternatively, the shutter can be released in a predetermined time after the detection in step S107 instead of the notification by the notifier 104 in step S106.

In step S107 a shutter controller 105 controls the shutter to release in a predetermined time after the display of the indicator. Then, shooting and image recording are performed in step S108. These operations are the same as those by the full press of the shutter button 2 and captured image data is stored in the memory card 34, for instance.

In shooting plural subjects, their faces are detected in step S102. Therefore, it is preferable to decide order of priority over the subjects in advance so that the arm gesture on which the imaging control bases can be decided from plural arm gestures in accordance with the order of priority of subjects in question. It can be configured to detect the rotational motion of only a major subject with the highest priority in step S104.

The priorities of subjects can be decided arbitrarily. For example, a face located at the center of the frame or a face in a largest size can be set to a major subject. Moreover, a plurality of priority patterns can be prepared to allow the user to select a desired pattern.

As described above, the imaging device according to the present embodiment can automatically release the shutter at a user's desired timing by using face detection and arm motion detection as a trigger even when a subject is far from the imaging device or a large number of subjects are concurrently shot so that the sizes of the subjects' faces are small.

Further, detecting the arm gesture of the subject after detecting the face makes it possible to improve the accuracy of the arm motion recognition and reduce erroneous recognition.

Further, the arm gesture can be obtained from the positional relation between the arm rotation center and the face center by simpler calculation and at a higher speed than finding a hand position by pattern recognition and then recognizing an arm gesture.

Further, in the hand detection and hand motion detection, the accuracy of detection may be decreased with a change in the shape of a hand. Meanwhile, hand motion as a parallel shift other than axial rotation is not a subject of detection in the present embodiment, which can improve the accuracy of arm gesture detection.

The coordinate of the center of the face area and the coordinate of rotation center and rotational angle of motion are used as the characteristic amount data. This makes it unnecessary to individually set or record specific parameters as arm length, arm rotational angle, and a distance between the centers of arm rotation and a face. Moreover, it is possible to accurately detect the hand or arm motion by discriminant formula based on a dictionary of various arm gesture data, irrespective of shapes of a hand or arm, a subject's age, gender, or body size. This arm gesture detection is unsusceptible to noise.

The imaging device includes a notifier to notify the detection of arm gesture to outside before shooting. This makes it possible for a subject person to know the detection of the gesture and prepare his or her facial expression or posture for photo taking.

Although the present invention has been described in terms of exemplary embodiments, it is not limited thereto. It should be appreciated that variations or modifications may be made in the embodiments described by persons skilled in the art without departing from the scope of the present invention as defined by the following claims. For example, the image input section 101, face detector 102, arm gesture detector 103, notifier 104, shutter controller 105, search area setter 201, block matching element 202, motion remover 203, noise vector remover 204, rotation center/rotational angle calculator 205, and rotational motion discriminator 206 can be realized by software or imaging program executed by the CPU 111 of the imaging device. Necessary data for execution of the software or program are loaded for example on the SDRAM 33. Alternatively, these elements can be configured as modules and a program to execute the functions of the face detector 102 and arm gesture detector 103 can be applied to hardware. A non-transit computer-readable medium storing the imaging program to cause the imaging device to execute the above operation can be also provided.

What is claimed is:

1. An imaging device, comprising:
   an image input section which sequentially inputs image data with a predetermined time interval;
   a face detector configured to detect a face area of a subject from the image data;
   a rotational motion detector configured to detect a rotational motion between two frames of image data input with the predetermined time interval; and
   a controller configured to control the imaging device to execute a predetermined operation when the rotational motion is detected by the rotational motion detector, wherein
   the rotational motion detector is configured to
      detect at least one candidate of rotational motion between the two frames of image data and calculate a coordinate of a rotation center and a rotational angle of said at least one candidate, and determine whether or not said at least one candidate is the rotational motion on the basis of a central coordinate of the face area detected by the face detector, the coordinate of the rotation center and the rotational angle, and wherein the rotational motion detector is further configured to set a search area on the basis of the face area detected by the face detector, divide each of the two frames of the image data into blocks of a predetermined number of pixels, detect a motion in each of the blocks in the search area, and extract at least one block in which the motion has been detected, detect an amount of motion in the extracted block as a motion vector, and calculate the coordinate of the rotation center and the rotational angle by using the motion vector as the candidate of rotational motion.

2. The imaging device according to claim 1, wherein the rotational motion detector is further configured to determine the coordinate of the rotation center on the basis of a position at which normal lines passing midpoints of the detected motion vectors intersect with each other, and calculate the rotational angle from the coordinate of the rotation center and positions of the detected motion vectors.

3. The imaging device according to claim 1, wherein the rotational motion detector is further configured to exclude the motion vector from the candidate of rotational motion when there is no other motion vector in a pixel area of a predetermined number of pixels around a pixel constituting the motion vector in question.

4. The imaging device according to claim 1, wherein the rotational motion detector is further configured to use the central coordinate of the face area, the coordinate of the rotation center and the rotational angle as characteristic amount data, and determine whether or not the candidate of rotational motion is the rotational motion by applying the characteristic amount data to a discriminant formula which is obtained according to a recognition dictionary learned in advance by a learning model.

5. The imaging device according to claim 1, wherein the rotational motion detector is further configured to detect an elbow of the subject as the coordinate of the rotation center and detect, as the rotational motion, a motion of a subject's arm with the elbow at a base point.

6. The imaging device according to claim 1, wherein the rotational motion detector is further configured to detect the rotational motion from second image data input after first image data from which the face detector has detected the face area of the subject as well as from third image data input a predetermined number of frames after the second image data.

7. An imaging device, comprising:

an image input section which sequentially inputs image data with a predetermined time interval;

a face detector configured to detect a face area of a subject from the image data;

a rotational motion detector configured to detect a rotational motion between two frames of image data input with the predetermined time interval; and a controller configured to control the imaging device to execute a predetermined operation when the rotational motion is detected by the rotational motion detector, wherein the rotational motion detector is configured to detect at least one candidate of rotational motion between the two frames of image data and calculate a coordinate of a rotation center and a rotational angle of said at least one candidate, and determine whether or not said at least one candidate is the rotational motion on the basis of a central coordinate of the face area detected by the face detector, the coordinate of the rotation center and the rotational angle, wherein the predetermined operation which the controller controls the imaging device to execute is a shooting operation, the imaging device further comprising a notifier configured to notify, when the rotational motion detector has detected the rotational motion, the detection of the rotational motion to outside before the controller allows the imaging device to execute the shooting operation.

8. An imaging method, comprising:

sequentially inputting image data with a predetermined time interval;

detecting a face area of a subject from the image data;

detecting a rotational motion between two frames of image data input with the predetermined time interval; and controlling the imaging device to execute a predetermined operation when the rotational motion is detected by the rotational motion detector, wherein the rotational motion detecting step further comprises detecting at least one candidate of rotational motion between the two frames of image data and calculating a coordinate of a rotation center and a rotational angle of said at least one candidate, and determining whether or not said at least one candidate is the rotational motion on the basis of a central coordinate of the face area detected by the face detector, the coordinate of the rotation center and the rotational angle, wherein the controlling step further comprises controlling the imaging device to execute a shooting operation, the method further comprising:

notifying, when the rotational motion is detected, the detection of the rotational motion to outside before the shooting operation is executed.

9. The imaging device of claim 7, wherein the rotational motion detector is further configured to set a search area on the basis of the face area detected by the face detector, divide each of the two frames of the image data into blocks of a predetermined number of pixels, detect a motion in each of the blocks in the search area, and extract at least one block in which the motion has been detected, detect an amount of motion in the extracted block as a motion vector, and calculate the coordinate of the rotation center and the rotational angle by using the motion vector as the candidate of rotational motion.

10. The imaging device of claim 9, wherein the rotational motion detector is further configured to determine the coordinate of the rotation center on the basis of a position at which normal lines passing midpoints of the detected motion vectors intersect with each other, and calculate the rotational angle from the coordinate of the rotation center and positions of the detected motion vectors.

11. The imaging device of claim 9, wherein
the rotational motion detector is further configured to exclude the motion vector from the candidate of rotational motion when there is no other motion vector in a pixel area of a predetermined number of pixels around a pixel constituting the motion vector in question.

12. The imaging device of claim 7, wherein
the rotational motion detector is further configured to use the central coordinate of the face area, the coordinate of the rotation center and the rotational angle as characteristic amount data, and determine whether or not the candidate of rotational motion is the rotational motion by applying the characteristic amount data to a discriminant formula which is obtained according to a recognition dictionary learned in advance by a learning model.

13. The imaging device of claim 7, wherein
the rotational motion detector is further configured to detect an elbow of the subject as the coordinate of the rotation center and detect, as the rotational motion, a motion of a subject's arm with the elbow at a base point.

14. The imaging device of claim 7, wherein
the rotational motion detector is further configured to detect the rotational motion from second image data input after first image data from which the face detector has detected the face area of the subject as well as from third image data input a predetermined number of frames after the second image data.

15. The method of claim 8, wherein the step of detecting the rotational motion further comprises:
setting a search area on the basis of the detected face area;
dividing each of the two frames of the image data into blocks of a predetermined number of pixels, detecting a motion in each of the blocks in the search area, and extracting at least one block in which the motion has been detected;
detecting an amount of motion in the extracted block as a motion vector; and
calculating the coordinate of the rotation center and the rotational angle by using the motion vector as the candidate of rotational motion.

16. The method of claim 15, wherein the step of detecting the rotational motion further comprises:
determining the coordinate of the rotation center on the basis of a position at which normal lines passing midpoints of the detected motion vectors intersect with each other, and calculating the rotational angle from the coordinate of the rotation center and positions of the detected motion vectors.

17. The method of claim 15, wherein the step of detecting the rotational motion further comprises:
excluding the motion vector from the candidate of rotational motion when there is no other motion vector in a pixel area of a predetermined number of pixels around a pixel constituting the motion vector in question.

18. The method of claim 8, wherein the step of detecting the rotational motion further comprises:
using the central coordinate of the face area, the coordinate of the rotation center and the rotational angle as characteristic amount data, and determining whether or not the candidate of rotational motion is the rotational motion by applying the characteristic amount data to a discriminant formula which is obtained according to a recognition dictionary learned in advance by a learning model.

19. The method of claim 8, wherein the step of detecting the rotational motion further comprises:
detecting an elbow of the subject as the coordinate of the rotation center and detecting, as the rotational motion, a motion of a subject's arm with the elbow at a base point.

20. The method of claim 8, wherein the step of detecting the rotational motion further comprises:
detecting the rotational motion from second image data input after first image data from which the face area of the subject has been detected, as well as from third image data input a predetermined number of frames after the second image data.

* * * * *